Dec. 28, 1926.

F. E. HAUGK 1,612,578

DRAFT APPLIANCE

Filed April 18, 1925    2 Sheets-Sheet 1

INVENTOR
Frank E. Haugk
BY
ATTORNEY

Dec. 28, 1926.

F. E. HAUGK 1,612,578

DRAFT APPLIANCE

Filed April 18, 1925    2 Sheets-Sheet 2

INVENTOR
Frank E. Haugk
BY
ATTORNEY

Patented Dec. 28, 1926.

1,612,578

UNITED STATES PATENT OFFICE.

FRANK E. HAUGK, OF WEST NEW YORK, NEW JERSEY.

DRAFT APPLIANCE.

Application filed April 18, 1925. Serial No. 24,160.

This invention relates to draft appliances and more particularly to means for detachably connecting draw-head or tow-line connections for use principally with tractors and trailers, automobiles and trucks; and the main object is to provide a connecting means which will automatically release or become disconnected when excessive loads or strains are suddenly encountered.

My invention consists of a connecting device comprising a draw-head, connecting bar, and two or more locking bolts engaging the connecting bar, and which bolts are held in locking position by spring pressure. In practice this device will be made in various sizes, each size having a definite load capacity, and this device may be made in various shapes to provide the desired mechanical strength and design or according to the purpose for which the device is to be employed.

Figure 1:
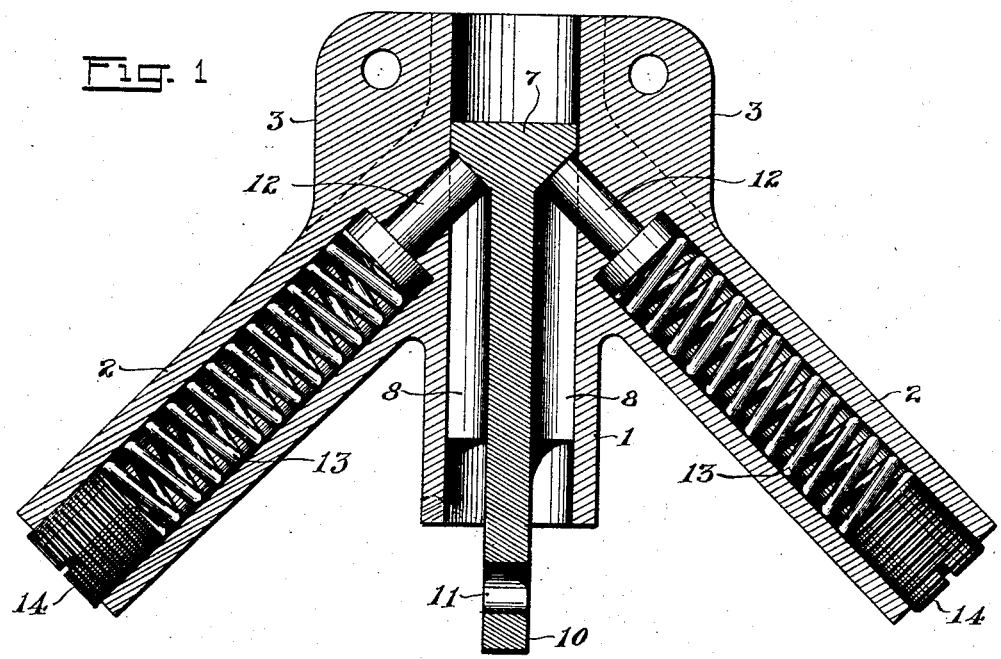
Figure 2:
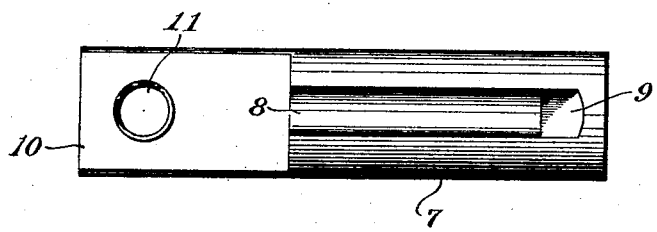
Figure 3:
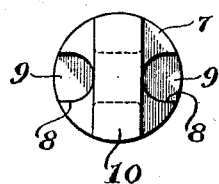
Figure 4:
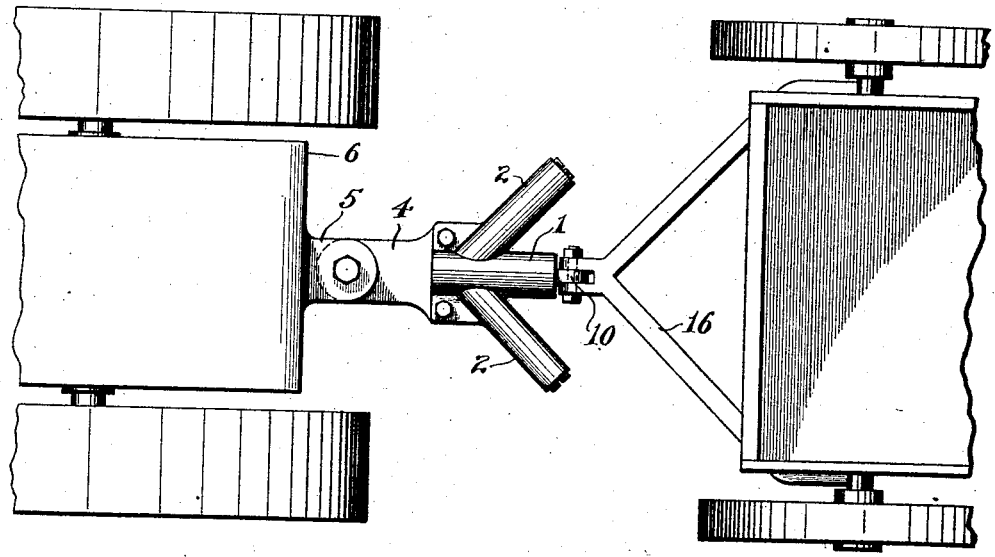

In the accompanying drawings which illustrate one form of my device, Figure 1 is a central section; Figures 2 and 3 longitudinal and end views, respectively, of the connecting bar; Figure 4, a view showing the device connected between a tractor and trailer; and Figure 5, a view of the device connected in a tow-line.

Referring to the drawings and particularly to Figures 1, 2 and 3, the draw-head is illustrated as comprising a body having a central cylindrically bored part 1, and two or more cylindrically bored projections 2, and a pair of lugs 3, each having a bolt hole and to which a connecting plate 4 (Figure 4) is bolted. This plate has a hole at the free end which is bolted between lugs 5 projecting from the frame or other suitable part 6 of the tractor. The connecting bar 7 is shown in the form of a cylindrical bar having grooves 8 terminating in beveled seats 9 at the inner or locking end of the bar. The other end of the connecting bar is reduced to a flat tongue 10 having a bolt hole 11. The connecting bar is locked in the drawhead by studs or bolts 12 which project into grooves 8 and engage seats 9. These locking bolts are held in locking position by springs 13 which are housed in the cylindrical projections 2 and seated between heads on the bolts 12 and screw plugs 14. The tension of springs 13 may be adjusted, if desired, by adjusting the screw plugs. Locking bolts 12 have a sliding fit in the reduced bore of cylinders 2 and the length of the bolts will be such that the tongue 10 of the connecting bar and the thickness of wall between grooves 8 will just clear the bolt ends when the heads rest at the bottoms of cylinders 2, so that when the connecting bar is in operative position the ends of all bolts will rest firmly upon seats 9. The connecting bar is placed in position within the draw-head by inserting tongue 10 into the forward end of the head, and between bolts 12, with slots 8 in alignment with the bolts, and pushing the connecting bar through until seats 9 engage the bolts.

Figure 5:
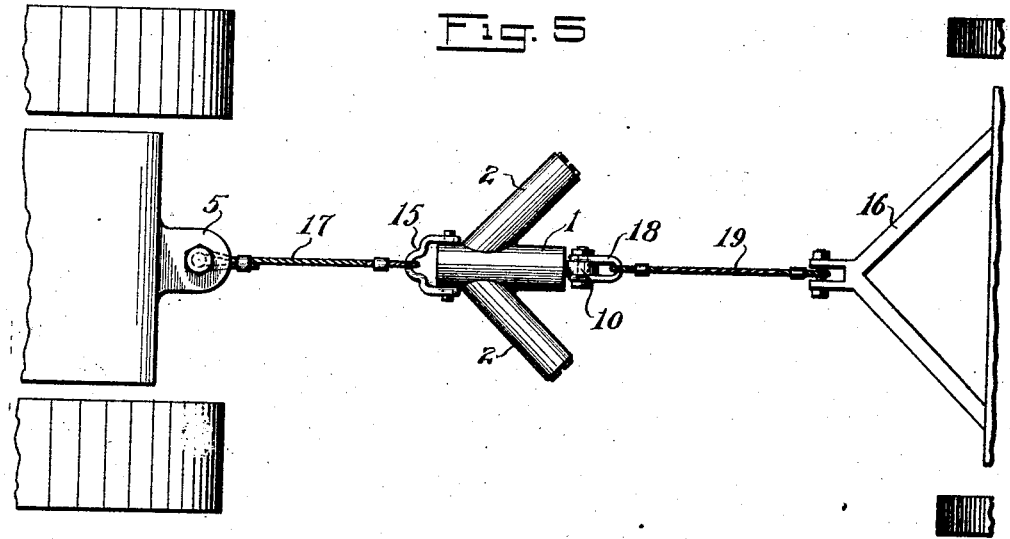

In Figure 5, the draw-head is provided with a shackle 15 for use with a towing cable 17 which may have a hook or loop to engage the bolt passing through lugs 5, on the tractor. In Figure 4, the connecting bar is bolted to lugs on yoke 16 attached to the trailer. In Figure 5, the connecting bar is bolted to a shackle 18 on cable 19, and which cable may have a hook or loop to engage the bolt on yoke 16. When the device is used with a towing cable it will be understood that the trailer may be any type of machine or car, and that in either case, the trailer may be any vehicle, piece of apparatus, tool or implement, and that any manner of engagement or connection of the draw-head and connecting bar to tractor and trailer may be employed. It will also be understood that any number of locking bolts, within limits, two, three or four, may be employed, and that the draw-head may be in any form, that is, the housings for the springs and locking bolts need not be in separate wings or projections, but instead, the head may be of circular or mushroom form and bored out for two, three or four locking bolts and springs.

In operation the connecting bar will pull against the spring pressed locking bolts, the capacity of the springs being such as to hold against a definite load or pull, and when this capacity or load is exceeded or the trailer encounters an obstruction, or for any cause the drawn apparatus suddenly places undue strain on the connecting bar or cable, such as would be likely to cause damage to either tractor or trailer, or to snap the towline, or shear a bolt, the connecting bar, due to the beveled seats on which the locking bolts rest, will cause the locking bolts to recede by compressing the springs and thereby permit the connecting bar to be pulled out of the draw-head. After the cause for sudden load or strain is removed, traction may be resumed by disconnecting the connecting bar from yoke 16 or shackle 18, and reinserting it in the draw-head to re-engage the locking bolts, as above explained, and again connecting it with the yoke or shackle.

What I claim is:

1. A draft appliance comprising a housing, having a central bore, a connecting bar movable therethrough, a locking bolt sliding in said housing, at an acute angle to and projecting into the path of said connecting bar, and an overload spring acting upon said bolt to directly engage said bar and whereby said bolt is moved against the tension of said spring out of locking position to release the coupling upon overload or overstrain thereon.

2. A draft appliance comprising a housing, having a central bore, a connecting bar movable therein, a plurality of locking bolts sliding in said housing, at an acute angle to and projecting into the path of said connecting bar, and an overload spring for said bolts, said bolts being equidistantly located about and directly engaging said bar and whereby said bolts are moved out of locking position against the spring tension to release the coupling upon overload or overstrain thereon.

3. A draft appliance comprising a housing, having a central bore, a connecting bar movable therethrough, a locking bolt sliding in said housing, at an acute angle to and projecting into the path of said connecting bar, and overload means for holding said bolt in locking engagement with said bar and permitting said bar to slide the bolt out of locking position upon excessive pull or strain thereon.

4. A draft appliance comprising a housing, having a central bore, a connecting bar movable therethrough, locking bolts sliding in said housing, at an acute angle to and projecting into the path of said connecting bar, and overload springs for holding said bolts in locking engagement with said bar and permitting said bar to slide said bolts out of locking position upon excessive pull or strain thereon.

5. A draft appliance comprising a housing having a central bore, a connecting bar movable therein and having a beveled shoulder, a locking bolt for said bar sliding in said housing at an acute angle and engaging said shoulder, and a coiled spring for holding said bolt in locking position and permitting said bolt to be wedged out of the path of said bar by said beveled shoulder upon the load or strain on said bar exceeding the pressure of said spring.

6. In a device of the character herein described, a connecting bar having a beveled shoulder, a sliding locking bolt for said bar, perpendicular to and engaging with said beveled shoulder, and a coiled spring for holding said bolt in locking position and permitting said bolt to be wedged out of the path of said bar by said beveled shoulder upon the load or strain on said bar exceeding the pressure of said spring.

7. In a device of the character herein described, a connecting bar having a beveled shoulder, a sliding locking bolt for said bar, perpendicular to and engaging with said beveled shoulder, a coiled spring for holding said bolt in locking position and permitting said bolt to be wedged out of the path of said bar by said beveled shoulder upon the load or strain on said bar exceeding the pressure of said spring, and means for adjusting the spring pressure.

8. In a device of the character herein described, the combination of a housing having a central bore, a connecting bar adapted to slide therein, a plurality of spring actuated locking bolts working in said housing and projecting into said central bore to engage said connecting bar, and means on said bar for causing said bolts to recede from locking position to release said bar upon excessive pull or strain thereon.

9. In a device of the character herein described, the combination of a draw-head having a central cylindrical bore, a connecting bar adapted to slide in said bore, said bar having a plurality of longitudinal grooves therein, and terminating in beveled seats forming a locking head on said bar, spring actuated locking bolts working in the draw-head and projecting into the grooves in said bar and engaging said seats to lock the bar in the draw-head, said beveled seats operating to move said bolts out of the path of said locking head upon excessive pull or strain on said bar.

10. In a device of the character herein described, the combination of a draw-head having a central cylindrical bore, a connecting bar adapted to slide in said bore, said bar having a plurality of longitudinal grooves therein and terminating in beveled seats forming a locking head on said bar, a series of spring barrels in said draw-head arranged at an angle to the central bore, helical springs in said barrels, locking bolts actuated by said springs and projecting from said barrels into the central bore and into the grooves in said connecting bar and engaging the beveled seats to lock the bar in the draw-head, and adjustable screw plugs closing said spring barrels, said beveled seats operating to move said bolts out of the path of said locking head upon excessive pull or strain on said bar.

This specification signed this 11th day of April 1925, at New York city, New York.

FRANK E. HAUGK.